United States Patent [19]

Geyer

[11] Patent Number: 4,724,748
[45] Date of Patent: Feb. 16, 1988

[54] OMNIBUS WITH AN AIR CIRCULATING SYSTEM

[75] Inventor: Ludwig Geyer, Puchheim, Fed. Rep. of Germany

[73] Assignee: MAN Nutzfahrzeuge GmbH, München, Fed. Rep. of Germany

[21] Appl. No.: 838,158

[22] Filed: Mar. 10, 1986

[30] Foreign Application Priority Data

Mar. 23, 1985 [DE] Fed. Rep. of Germany ....... 3510706

[51] Int. Cl.⁴ .............................................. B60H 1/24
[52] U.S. Cl. ........................................ 98/2.03; 98/2.11; 98/2.15; 98/DIG. 10; 62/244
[58] Field of Search ............... 62/239, 244; 98/2, 2.03, 98/2.11, 2.15, DIG. 10, DIG. 11

[56] References Cited

U.S. PATENT DOCUMENTS

| | | | |
|---|---|---|---|
| 2,180,760 | 11/1939 | Mayo | 98/2.03 X |
| 2,344,864 | 3/1944 | Griswold | 98/2.03 X |
| 4,304,314 | 12/1981 | Sakaguchi et al. | 98/2.03 X |
| 4,376,408 | 3/1983 | Lijima et al. | 98/2.03 |
| 4,432,213 | 2/1984 | Katahira et al. | 62/244 X |
| 4,527,400 | 7/1985 | Greenheck et al. | 62/239 |
| 4,612,975 | 9/1986 | Ikari | 62/244 |

FOREIGN PATENT DOCUMENTS 2508955 9/1976 Fed. Rep. of Germany ....... 98/2.03

Primary Examiner—Harold Joyce
Attorney, Agent, or Firm—Scully, Scott, Murphy & Presser

[57] ABSTRACT

At its rear end a fully air conditioned omnibus has an air circulating device whose air inlet ports are placed underneath the rear seat row of the omnibus in order to prevent interference with the comfort of the passengers seated thereon.

1 Claim, 1 Drawing Figure

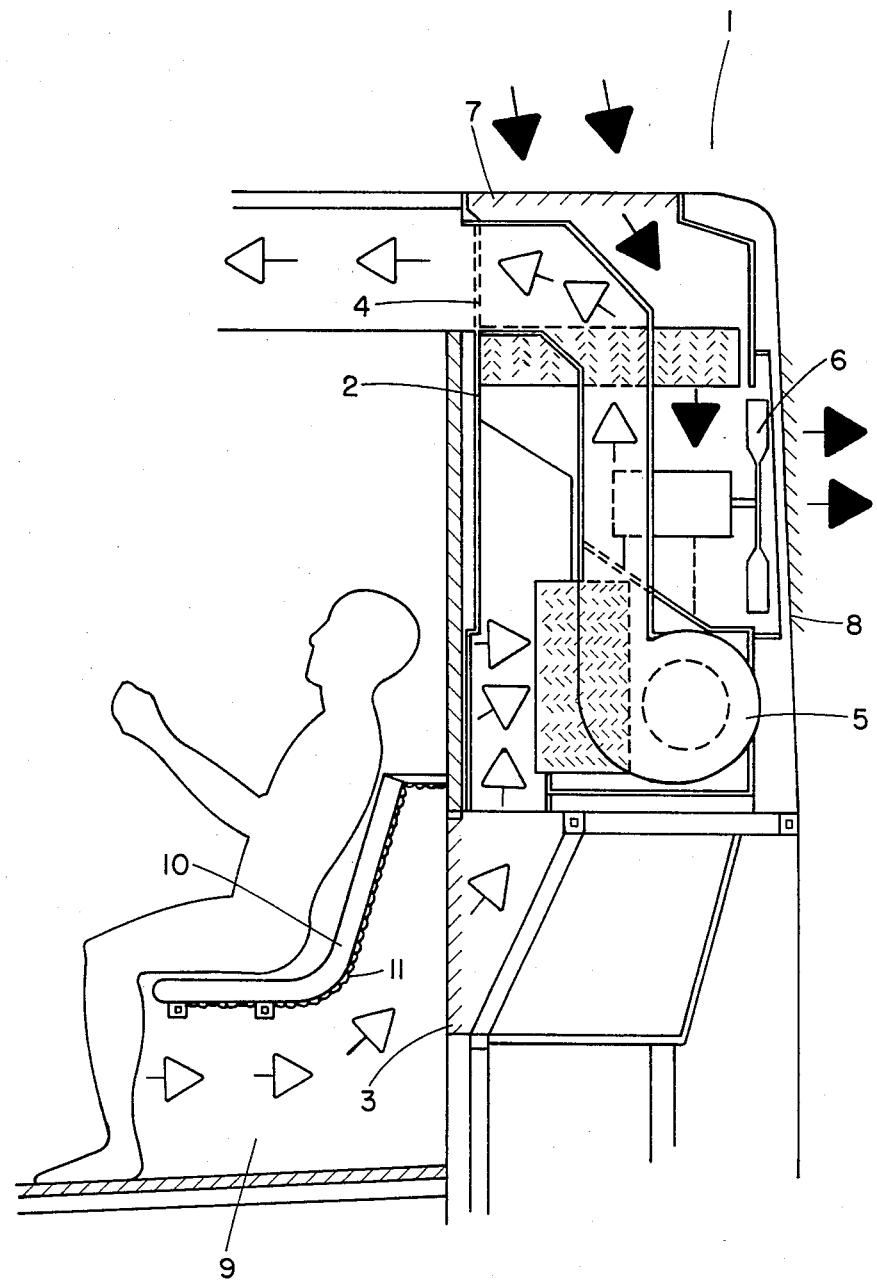

OMNIBUS WITH AN AIR CIRCULATING SYSTEM

BACKGROUND OF THE INVENTION

The invention relates to an omnibus with an air conditioning system having an intake port placed at the rear row of seats of the omnibus and opening into the space in the omnibus provided for the passengers.

At the rear and over the engine space such a fully air conditioned omnibus has a space for the accommodation of the air conditioning unit which includes a powerful blower to cause circulation of the air within the omnibus.

This interior air is taken in through at least one suction port which is placed at the rear row of seats in the partition separating the said space for the air conditioning unit from the passenger space, that is to say in the rear end wall of the omnibus.

The cleaned and cooled air is propelled by the said blower through a duct arranged along the roof to the air outlet nozzles provided for the individual passenger seats.

In order to ensure that front seats at the greatest distance from the blower are amply supplied with conditioning air, it is necessary for the circulating blower to build up a substantial pressure. Since on the other hand, more especially in hot countries there is a substantial heating of the passenger space owing to solar radiation and the high temperature of the outside air which makes its way into the interior of the omnibus, it is furthermore necessary for the circulation blower to have a very high volumetric capacity. Since the blower is designed for a high circulation rate to meet this requirement, it will necessarily be loud in operation, and the noise engendered by it will also be heard through the intake port or ports. Furthermore the air velocity at the intake port will often by relatively high so that a considerable amount of noise will arise as the air flows through the nozzle. These two sources of noise lead to a substantial interference with the comfort of the passengers using the rear row of seats in the interior of the bus.

A further point to be considered is that the powerful air flow being drawn into the intakes will be a cause of discomfort for such passengers and, to take one instance, cigarette smoke exhaled by such persons will be blown back into their faces. Moreover, the effect of the air outlet nozzles, which are intended to supply conditioned air to the persons using the rear seat row is considerably interfered with by the air drawn in from the interior to be air conditioned; futhermore the persons on the rear row of seats will be constantly exposed to the heated stale air in the interior of the omnibus. On the other hand in the foot space of the rear seat row a zone of practically stationary air builds up, in which cold air sinks downwards so that the persons on the rear seat row have to put up with cold feet in addition to the noise from operation of the air conditioning system and the presence of unconditioned air at the level of the chest and head.

Some of these undesired effects might be made less severe if the air intake port were to be increased in size, but then it would be necessary to have a bulky air duct running from the intake port to the circulating blower, which would not be able to be accommodated in the space for the air conditioning unit.

SHORT OUTLINE OF THE INVENTION

In view of these shortcomings of known designs, one object of the present invention is to reduce undesired effects felt by the persons on the rear seat row and caused by the air conditioning system serving the passenger space.

In order to attain this or other objects appearing from the ensuing specification, the intake port is covered by the rear seat row. As a result, in the invention, the intake port is not placed near the heads of the persons on the rear seat row but under the seats at the rear in such a way that it is covered by the rear seat row. Consequently the noise produced at the air intake port on the one hand and the noise coming out of the air intake port originating from the circulation blower is so screened off by the said seat row itself that it no longer interferes with the comfort of the persons using the back seat row. A further point is that the heads and chests of the persons on the rear row of seats are in a calm air zone, in which the flow of air from the air outlet nozzles for the conditioned air is in now way impaired. It is only the feet of the persons in question that are within an air current, but such air is warm so that the condition due to the present invention does at least not lead to chilly feet as would be the case with the initially mentioned omnibusses. Moreover, the air intake port may be arranged to extend over the full width of the omnibus so that the velocity of the air at the air intake port is low, for the space available under the row of seats is large enough for the accommodation of an air duct without it then being difficult to provide accommodation within the space intended for the air conditioning unit as such.

It is also possible to distribute a number of air intake ports across the breadth of the omnibus so that they are located under the arm rests separating the individual seats and the air current flows past the legs of the users of the rear seats towards each of the air intake ports.

It is possible to place the air intake port or ports as far forward under the rear seats as possible without disturbing the comfort of the persons sitting on the rear seat row. In accordance with one development of the invention it is however an advantage to set back the air intake port to some degree so that an intake channel or duct is formed between the passenger space and the intake port, such duct being walled off at the top by the rear row of seats. This intake duct, which preferably stretches along the full width of the vehicle, causes the air velocity at the level of the legs of the seated passengers to be still quite low and only to increase towards the air intake port. Furthermore owing to the setting back of the intake port the noises produced thereat or transmitted therethrough to the outside are screened off from the passengers to an even better degree. However, it is lastly possible to utilize the space under the rear row of seats to a limited extent for the deposit of luggage inasfar as pieces of luggage do not obstruct the air intake port as such, since the intake cross section available at the front edge of the row of seats is quite ample and may therefore be taken up by the deposit of one or more items of luggage without disadvantageous effects.

The useful effects produced by this form of the invention may be increased if, in accordance with a further development of the invention, the intake duct is bent to the rear and upwards, the air intake port not being located at the level of the vehicle floor but spaced from and over it, preferably in such a way that the air intake ports or ports are generally behind the back of the rear row of seats.

Therefore the intake duct is made longer and its noise damping and flow stabilizing effect is made even more pronounced. Furthermore in an omnibus with the last feature of the invention mentioned it is not possible for the intake port to be obstructed by an item of luggage which has been pushed under the rear row of seats.

A further constructional advantage of the last-named feature of the invention is to be seen in the fact that the air intake port is located at the lower side of the space for the air conditioning unit so that it is not necessary to accommodate a complex air duct in the engine space.

In order to decrease the noise of operation of the air conditioning system even further and more especially to prevent the noise issuing from or produced at the intake port from being heard through the seat of the back of the rear row of seats, in accordance with a further development of the invention it is possible for the surface of the rear seat row forming part of the wall of the intake duct to be provided with an acoustically damping coating.

Furthermore, in keeping with a further form of the invention a useful effect may be achieved by placing means for guiding and cleaning the air in the intake duct walled off by the rear row of seats, such means being for example a means for causing the air direction to be reversed in order to separate dust particles from the air, or by arranging a filter unit under the rear row of seats in order to at least partly filter the air taken in by the air intake.

As part of a still further feature of the invention a useful effect is to be gained if the rear row of seats may be moved upwards (i. e. preferably by being able to be folded) out of the way so that it is readily possible to gain access to the air intake port and to the filters which will generally be placed behind it.

BRIEF DESCRIPTION OF THE DRAWING

Reference may now be had to the following detailed description of a preferred embodiment of the invention, taken in conjunction with the accompanying single FIGURE of the drawing illustrating, generally diagrammatically, a side elevational sectional view of the rear part of an omnibus showing the inventive air circulation system.

DETAILED ACCOUNT OF WORKING EXAMPLE OF THE INVENTION

The rear end 1 of an omnibus has two superposed spaces separated from the passenger space, that is to say a lower engine space and an upper space 2 for an air conditioning unit.

This latter space 2 communicates via an intake port 3 with the passenger space or interior of the omnibus and via an air outlet 4 with a distribution duct for conditioned air.

The air current is indicated by the white headed arrows and is produced by a circulation blower 5, which is in the form of a powerful radial blower.

In the space for the air conditioning unit there is a further blower 6, that is located in an upright duct which connects a cool air intake port 7 located in the roof of the omnibus with an cool air outlet port in the rear end of the omnibus. Within this upright duct there are the heat dissipating parts of a heat pump system; the air current through this upright duct is marked by black headed arrows.

The two air ducts for the space 2 of the conditioning unit and for the latter may be joined together in order to mix fresh air with the conditioned air blown out through the outlet port 4, such fresh air being drawn in through the cool air intake port 7. It is also necessary to take steps to see that no vacuum is produced in the passenger space, since this might possibly lead to engine exhaust being sucked into the passenger space and in any case warm outside air would be drawn into the inner space.

As will be seen from the FIGURE the intake port 3 is generally at the same level as the back of the row 10 of rear seats. This row 10 of rear seats is in the form of a shell seat with a seat face and a seat back and is supported on transverse beams. The upper end of the rack rest is placed so as to be closely adjacent to and connected with the rack wall of the passenger compartment. Accordingly together with the floor of the omnibus an intake duct 9 is defined by the rear seat row 10 so that air may flow through the duct 9 before flowing into the intake port 3. The row 10 of seats may be folded upwards (not shown).

It will be seen that the circulating air marked by the white headed arrows and drawn in through the intake port 3 noway interferes with the comfort of the person shown in the drawing as sitting on the back seat row 10. This person is screened from noise produced at or transmitted out through the port 3. This screening effect is further improved inasfar as the back and lower sides of the back seat row 10 are covered with the acoustic insulating material 11 having the effect of simultaneously providing a smooth surface to the lower part of the seat row 10 so that there are no projecting obstructions which might otherwise cause turbulence.

I claim:

1. An omnibus including a passenger compartment having a plurality of rearwardly spaced seats; comprising:
   (a) means for conducting air from said passenger compartment to below the rearmost of said seats; air duct means behind a backrest of said rearmost seat for receiving the air from said passenger compartment;
   (b) said air duct being divided into first and second vertically extending duct portions said second duct portion existing in parallel with and rearwardly of said first duct portion in the longitudinal direction of said omnibus;
   (c) the first of said duct portions being proximate to said rearmost seat communicating with the passenger compartment below said seat and communicating with the suctioning opening of a blower;
   (d) said blower having a discharge opening in communication with said second duct portion;
   (e) said second duct portion having an upper end connecting into an air distribution passageway extending along the ceiling of the passenger compartment in the longitudinal direction of said omnibus;
   (f) and said blower being arranged at the lower end of said second duct portion and rearwardly of said first duct portion.

* * * * *